United States Patent [19]
Potts

[11] Patent Number: 5,809,584
[45] Date of Patent: Sep. 22, 1998

[54] TRAVEL POTTY APPARATUS

[76] Inventor: Ruth A. Potts, 4800 Emery, Kansas City, Mo. 64136

[21] Appl. No.: 850,739

[22] Filed: May 2, 1997

[51] Int. Cl.⁶ .................................................... E03D 9/00
[52] U.S. Cl. ...................................................... 4/254; 4/239
[58] Field of Search ............................... 4/254, 239, 240, 4/235

[56] References Cited

U.S. PATENT DOCUMENTS

| | | | |
|---|---|---|---|
| 1,297,177 | 3/1919 | Johnson | 4/239 |
| 2,752,610 | 7/1956 | Mabrey | 4/254 |
| 3,371,356 | 3/1968 | Benjamin | 4/239 |
| 4,205,404 | 6/1980 | Levins | 4/254 |
| 4,777,672 | 10/1988 | Gebhard et al. | 4/239 |
| 5,090,063 | 2/1992 | Edwards et al. | 4/239 |
| 5,161,263 | 11/1992 | Geneve et al. | 4/483 |
| 5,311,618 | 5/1994 | Breimon et al. | 4/239 |
| 5,524,295 | 6/1996 | Ford | 4/239 |

*Primary Examiner*—David J. Walczak
*Attorney, Agent, or Firm*—Henderson & Sturm

[57] ABSTRACT

A travel potty apparatus 10 for use on the seat 101 of a conventional toilet 100. The apparatus 10 includes a seat unit 12 and a seat extension unit 13 for covering the seat 101 and front portion of the standard toilet 100. The seat and seat extension units 12 and 13 are operatively associated with, and dimensioned to be received within a compartmented carry case unit 11.

15 Claims, 2 Drawing Sheets

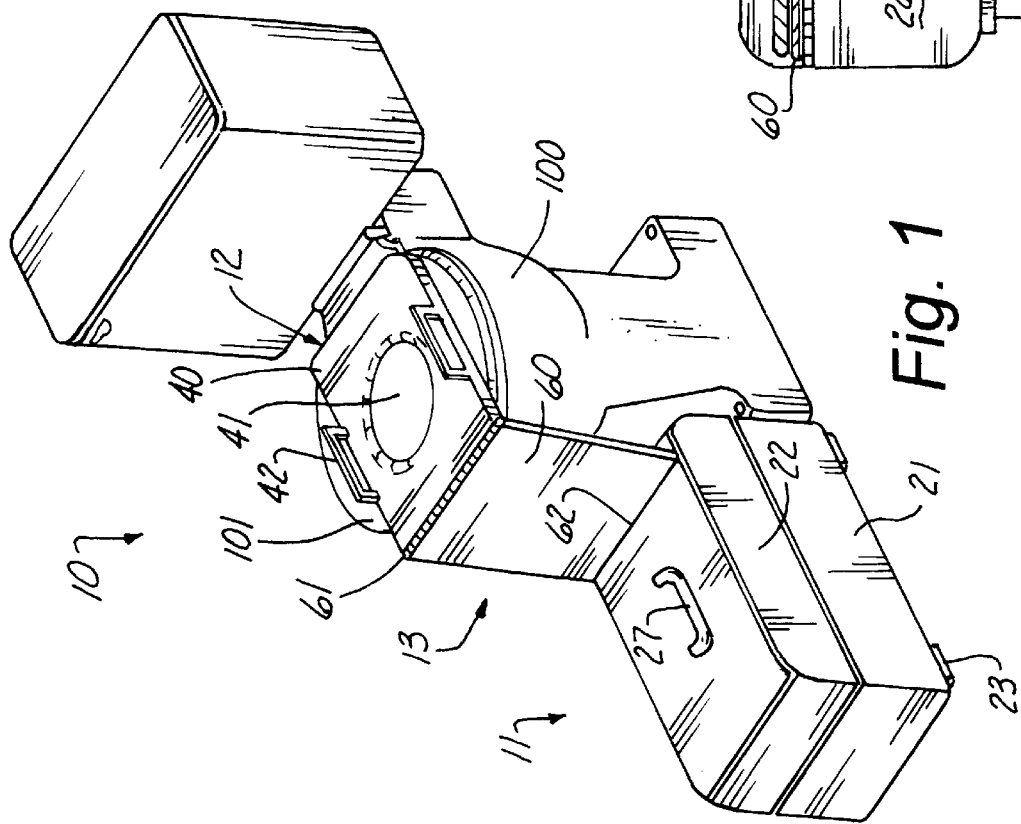
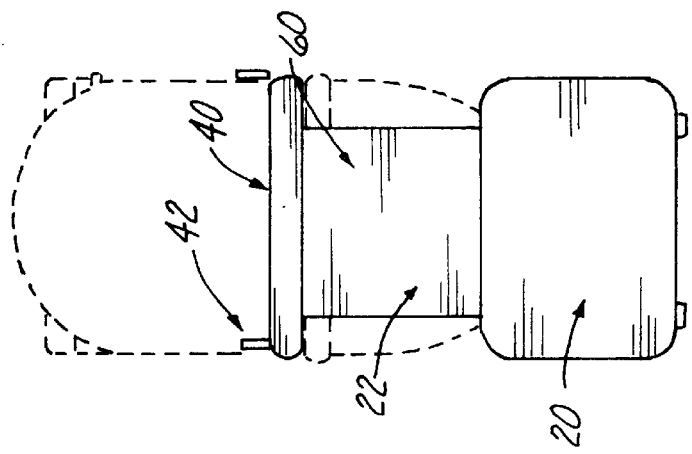
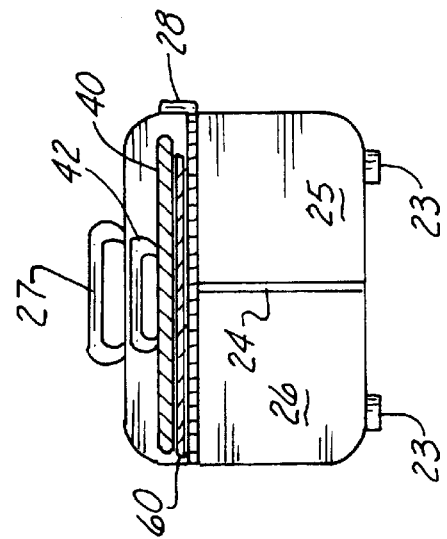

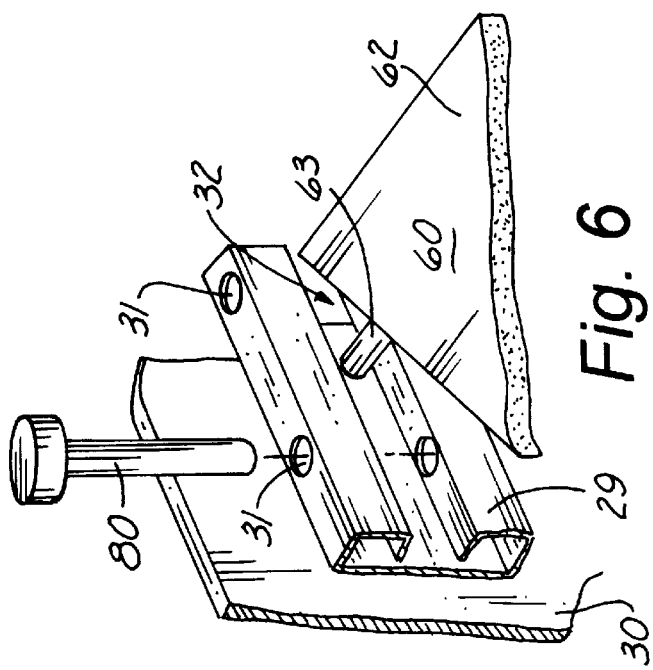
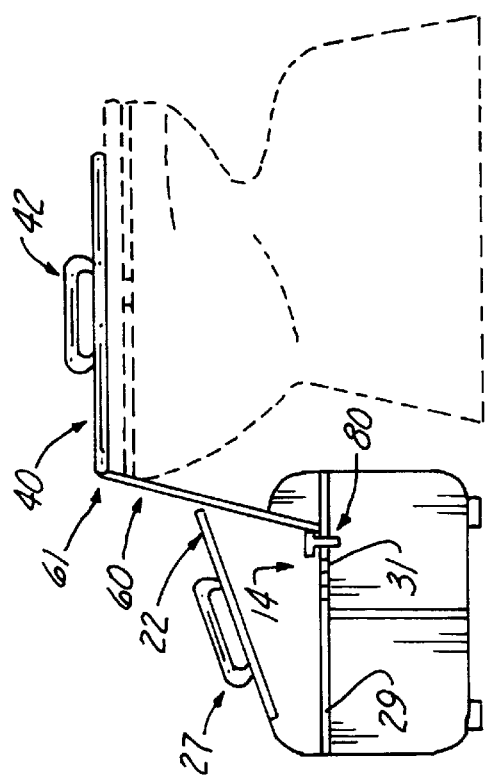
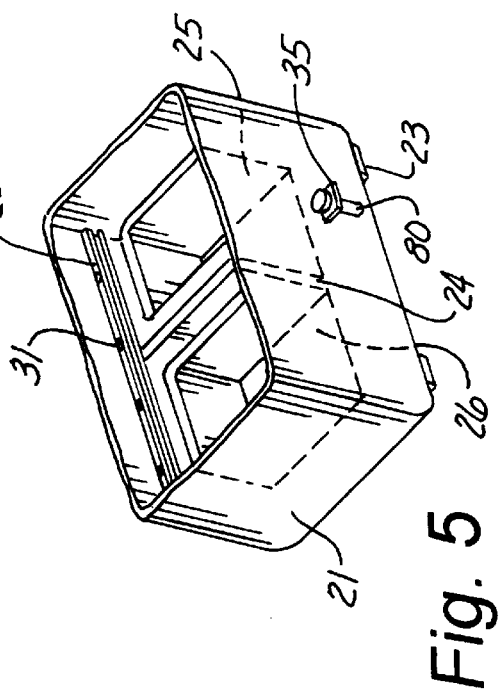

5,809,584

TRAVEL POTTY APPARATUS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of portable commodes in general, and in particular to a portable self-contained training potty for young children.

2. Description of Related Art

As can be seen by reference to the following U.S. Pat. Nos. 3,371,356; 5,090,063; 5,161,263; and 5,524,295; the prior art is replete with myriad and diverse portable commodes, including self-contained packaged toilet seats, training seats and the like.

While all of the aforementioned prior art constructions are more than adequate for the basic purpose and function for which they have been specifically designed, these patented structures are neither designed, nor intended to provide all of the different functions that are produced by the subject matter that forms the basis of the present invention.

As anyone who travels with small children is acutely aware, regardless of whether they are potty trained or not, one of the most difficult aspects of long distance travel is encountered in public restroom facilities wherein the adults primary concern is to prevent the child from coming into contact with germs and filth, while their secondary concern is to reinforce, if necessary, the child's potty training lessons in a strange or at least unfamiliar environment.

As a consequence of the foregoing situation, there has existed a longstanding need among parents for a new type of self-contained travel potty apparatus that will transport a child's potty seat, provide a step platform for a child to gain access to the elevated potty seat while covering the top and front of a standard toilet so that the child will not come into contact with those surfaces on the standard toilet. The provision of such a construction is a stated objective of the present invention.

BRIEF SUMMARY OF THE INVENTION

Briefly stated, the travel potty apparatus that forms the basis of the present invention comprises a carry case unit, a seat unit, a seat extension unit, and an optional locking unit.

As will be explained in greater detail further on in the invention, the seat extension unit is hingedly connected on one end to the seat unit and in one version of the invention operatively connected on the other end to the carry case unit by the optional locking unit.

In addition, in the alternate version of the invention, the carry case unit is provided with a plurality of interior storage compartments and one or more track guides which captively engage one end of the seat extension unit.

Furthermore, in the preferred version of the invention, the lid of the carry case unit is further provided with a recessed handle element such that the lid of the carry case unit may serve as a step surface to assist the child in climbing onto the seat unit which rests upon a standard toilet seat.

BRIEF DESCRIPTION OF THE SEVERAL VIEW OF THE DRAWING

These and other attributes of the invention will become more clear upon a thorough study of the following description of the best mode for carrying out the invention, particularly when reviewed in conjunction with the drawings, wherein:

FIG. 1 is a perspective view of the travel potty apparatus that forms the basis of the preferred version of the present invention in use;

FIG. 2 is a cross-sectional view of the preferred version of the apparatus in its collapsed mode;

FIG. 3 is a front plan view of an alternate version of the preferred embodiment;

FIG. 4 is a side plan view of the alternate version;

FIG. 5 is a cut away view of the carry case unit of the alternate version of the invention; and FIG. 6 is an isolated detail view of the optional locking unit cooperating with the track guide and seat extension unit of the alternate version.

DETAILED DESCRIPTION OF THE INVENTION

As can be seen by reference to the drawings, and in particularly to FIG. 1, the travel potty apparatus that forms the basis of the present invention is designated generally by the reference number 10 and comprises in general, a carry case unit 11, a seat unit 12, a seat extension unit 13, and an optional locking unit 14. These units will now be described in seriatim fashion.

As can be seen by reference to the drawings, and in particular to FIG. 1, the travel potty apparatus 10 is designed for use in conjunction with the seat 101 of a standard toilet 100. The carry case unit 11 comprises in general, a carry case member 20 having a lower base portion 21 and an upper lid portion 22 hingedly connected to the base portion 21.

In addition, as shown in FIGS. 1 and 2, the lower base portion 21 is provided with a plurality of rubberized legs 23 and an internal divider 24 which creates a plurality of internal compartments 25, 26. The upper lid portion 22 is provided with a recessed handle element 27 and a clasp 28 for securing the free end of the lid portion 22 to the base portion 21 in a well recognized manner.

Still referring to FIGS. 1 and 2, it can be seen that the seat unit 12 comprises in general, a training seat member 40 which is dimensioned to overlie a major portion of the seat 101 of a standard toilet 100. The training seat member 40 is provided with a central opening 41 and a pair of seat handles 42 which are used to position the training seat member 40 on top of the standard toilet seat 101.

As can best be seen by reference to FIG. 1, the seat extension unit 13 comprises a panel member 60 which is hingedly connected as at 61 to the leading edge of the training seat member 40 and wherein the free lower end 62 of the panel member 60 is intended to rest on top of the lid portion 22 of the carry case member 20.

At this juncture, it should be noted that the embodiment depicted in FIGS. 1 and 2 constitutes the preferred version of the invention. The lid portion 22 of the carry case member 20 serves as a step means to assist the child in climbing onto and sitting upon the training seat member 40 and the panel member 60 prevents the child's legs from coming into contact with the front portion of the standard toilet bowl.

In the alternate version of the preferred embodiment depicted in FIGS. 3 through 6, it can be seen that the optional locking unit 14 comprises the main distinction between the two versions. In addition, as shown in FIGS. 5 and 6, the optional locking unit 14 comprises an elongated locking member 80 which is dimensioned to be received within and cooperate with complimentary structural features on both the carry case member 20 and the seat extension panel member 60.

Referring to FIGS. 5 and 6, it can be seen that the carry case member 20 is further provided with a pair of internal track members 29 affixed to the interior walls 30 of the base portion 21 of the carry case member 20. In addition, the track members 29 are further provided with a plurality of apertures 31 dimensioned to receive a portion of the locking member 80 and a transverse groove 32 whose purpose and function will be explained presently.

Still referring to FIGS. 5 and 6, it can be seen that the lower end 62 of the seat extension panel member 60 is provided with a plurality of pegs 63 which are dimensioned to be received in the transverse groove 32 in the track members 29. The locking member 80 is inserted into the selected apertures 31 in the track member 29 to limit the movement of the seat extension panel member 60 relative to the carry case member 20.

In addition, as shown in FIG. 5, the carry case member 20 is further provided on its exterior surface with an optional exterior tang 35 which is dimensioned to receive the locking member 80 when it is not in use.

At this juncture, it should be appreciated that in both versions of the invention the seat unit 12 and seat extension unit 13 are designed and dimensioned to be folded and collapsed into a compact form for storage within the upper lid portion 22 of the carry case member 20. The interior compartments 25 and 26 are provided to store both clean and soiled sanitary cleaning materials that would be employed on the seat unit 12 and attached seat extension unit 13 after each use.

Furthermore, the most distinctive difference between the preferred and alternate versions of the embodiment resides in the fact that in the preferred version there is no physical connection between the carry case unit 11 and the seat and seat extension units 12 and 13. Whereas, in the alternate version the physical connection is provided by the locking unit 14 and its cooperating structure.

In use, a parent or guardian concerned about the sanitary conditions of public toilets, would place the apparatus directly below the bowl of an open standard toilet 100. The parent would then open the lid by removing the exterior latch, exposing the folded components of the child's potty seat. The parent would then pull the child's potty seat handles up while sliding the seat extension forward and place the conforming child's potty seat atop the seat of a standard toilet. Once the seat has been placed on top of the conventional toilet seat, the user would then secure the locking pin in one of four holes. A child would either climb or be placed upon the child's potty seat and would use it in a standard manner, providing a sanitary toilet facility for the child. After the child has completed their use of the apparatus 10, the parent would wipe the child's potty seat thoroughly and retract is from the standard toilet by removing the locking pin and collapsing the child's potty seat over the seat extension. The parent would then close the lid and secure the exterior latch, placing any soiled materials in one of the two storage compartments. Use of the apparatus 10 would allow a child to use any standard toilet with the same convenience, safety, and sanitary conditions as would be afforded by a home based training potty or potty seat.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooded parts together, whereas, a screw employs a helical surface, in the environment of fastening wooden parts, a nail and a screw may be equivalent structures.

I claim:

1. A travel potty apparatus for use on the toilet seat of a conventional toilet wherein the apparatus comprises:

a carry case unit having an interior and including an upper lid portion and a lower base portion;

a seat unit dimensioned to overlie at least a substantial portion of said conventional toilet seat; and a seat extension unit hingedly connected to one end of said seat unit and dimensioned to engage said carry case unit on the opposite end wherein said lower base portion is divided into a plurality of compartments and said upper lid portion is dimensioned to receive the seat unit and the seat extension unit.

2. The apparatus as in claim 1 further including:

step means associated with said carry case unit for assisting a child in positioning themselves on said seat unit.

3. The apparatus as in claim 2 wherein said step means comprises the upper lid portion of the carry case unit.

4. The apparatus as in claim 1 wherein said seat unit comprises a training seat member having a pair of seat handles.

5. The apparatus as in claim 1 further including:

means for operatively connecting the said opposite end of the seat extension unit to the interior of said carry case unit.

6. The apparatus as in claim 1 wherein the seat extension unit comprises a panel member whose upper end is hingedly connected to said seat unit and whose lower end is provided with a pair of pegs and wherein the interior of the base portion of the carry case unit is provided with track members that are dimensioned to receive said pair of pegs.

7. The apparatus as in claim 6 further including:

a locking means for captively engaging said pegs within said track members.

8. The apparatus as in claim 7 wherein said track members are provided with a plurality of apertures and said locking means comprises a locking member dimensioned to be received in at least a selected one of said plurality of apertures.

9. A travel potty apparatus for use on the toilet seat of a conventional toilet wherein the apparatus comprises:

a carry case unit having an interior and including an upper lid portion and a lower base portion;

a seat unit dimensioned to overlie at least a substantial portion of said conventional toilet seat; and a seat extension unit hingedly connected on one end to said seat unit and dimensioned to engage said carry case unit on the opposite end wherein the seat extension unit comprises a panel member whose upper end is hingedly connected to said seat unit and whose lower end is provided with a pair of pegs and wherein the interior of the base portion of the carry case unit is provided with track members that are dimensioned to receive said pair of pegs.

10. The apparatus as in claim 9 further including:

a locking means for captively engaging said pegs within said track members.

11. The apparatus as in claim 10 wherein said track members are provided with a plurality of apertures and said locking means comprises a locking member dimensioned to be received in at least a selected one of said plurality of apertures.

12. The apparatus as in claim 9 further including:

step means associated with said carry case unit for assisting a child in positioning themselves on said seat unit.

13. The apparatus as in claim 12 wherein said step means comprises the upper lid portion of the carry case unit.

14. The apparatus as in claim 9 wherein said seat unit comprises a training seat member having a pair of seat handles.

15. The apparatus as in claim 9 further including:

means for operatively connecting the said opposite end of the seat extension unit to the interior of said carry case unit.

* * * * *